United States Patent [19]

Miyama et al.

[11] Patent Number: 5,367,016
[45] Date of Patent: Nov. 22, 1994

[54] REINFORCED RESIN COMPOSITION

[75] Inventors: Osamu Miyama, Osaka; Katsutoyo Fujita, Hyogo; Hayato Nishimura, Mie; Shigemi Matsumoto, Hyogo; Satoshi Tonoki, Osaka, all of Japan

[73] Assignee: Kanegafuchi Chemical Industry Co., Ltd., Osaka, Japan

[21] Appl. No.: 980,008

[22] Filed: Nov. 23, 1992

[30] Foreign Application Priority Data

Nov. 28, 1991 [JP] Japan .................. 3-314684

[51] Int. Cl.$^5$ .............................. C08L 69/00
[52] U.S. Cl. ........................ 524/537; 524/447
[58] Field of Search ..................... 524/447, 537

[56] References Cited

U.S. PATENT DOCUMENTS

| 4,337,192 | 6/1982 | Campbell | 525/444 |
| 4,357,271 | 11/1982 | Rosenquist | |
| 4,703,082 | 10/1987 | Godlewski | 524/731 |
| 5,189,091 | 2/1993 | Laughner | 525/439 |

FOREIGN PATENT DOCUMENTS

| 36-14035 | 8/1961 | Japan . |
| 39-20434 | 9/1964 | Japan . |
| 55-9435 | 3/1980 | Japan . |
| 62-13378 | 3/1987 | Japan . |
| 62-34792 | 7/1987 | Japan . |
| 62-37671 | 8/1987 | Japan . |
| 62-295951 | 12/1987 | Japan . |
| 63-83158 | 4/1988 | Japan . |

Primary Examiner—Vasu S. Jagannathan
Attorney, Agent, or Firm—Jordan and Hamburg

[57] ABSTRACT

A reinforced resin composition comprising 100 parts by weight of a resin component comprising a polycarbonate resin, a thermoplastic polyester resin and an impact modifier in a ratio, by weight, of 90-10:10-90:0-40 and 0.5 to 100 parts by weight of kaolin with a mean particle diameter of 0.1 to 4.0 μm. The composition can be molded by conventional techniques such as injection molding and extrusion molding into automotive parts, electrical or electronic parts and other products excellent in heat resistance, impact resistance, rigidity, dimensional stability, chemical resistance, moldability, weather resistance and thermal stability with a low linear coefficient of expansion and excellent surface gloss and appearance.

13 Claims, No Drawings

5,367,016

REINFORCED RESIN COMPOSITION

BACKGROUND OF THE INVENTION

The present invention relates to a reinforced resin composition which is useful for automotive and electrical/electronic parts, among others.

Polycarbonate resin is known as a plastic material having the highest impact resistance of all engineering plastics as well as satisfactory heat resistance and is in broad use in a variety of applications where these characteristics are much valued. However, this resin has some drawbacks, namely poor chemical resistance, poor moldability, and thickness dependence of impact strength. On the other hand, theremoplastic polyester resin is excellent in chemical resistance and workability but poor in impact resistance and dimensional stability.

To make the most of the advantageous characteristics and make up for the drawbacks of such respective resins, a variety of compositions have heretofore been reported in the literature including Japanese Patent Publication Nos. 36-14035, 39-20434, 55-9435, 62-37671, 62-34792 and 62-13378, and Japanese Kokai Patent Publication Nos. 62-295951 and 63-83158, among others.

Thus, Japanese Patent Publication No. 36-14035 discloses a thermoplastic material comprising a 4,4'-dioxydiarylalkane polycarbonate and polyethylene terephthalate. J.P. Publication No. 39-20434 describes a resin composition comprising a 4,4'-dioxydiarylalkane polycarbonate, a polyolefin and a saturated polyester. J.P. Publication No. 55-9435 discloses a thermoplastic resin composition comprising an aromatic polyester, an aromatic polycarbonate and a butadiene graft copolymer. Described in J.P. Publication No. 62-37671 is a thermoplastic resin composition comprising a saturated polyester resin, a polycarbonate resin and a polyacrylate rubber-containing polymer as main components. J.P. Publication No. 62-34792 discloses a polycarbonate resin composition comprising a polycarbonate resin, a saturated polyester resin, a polyolefin resin and an acrylate rubber-containing vinyl polymer. J.P. Publication No. 62-13378 describes a polycarbonate resin composition comprising a polycarbonate resin, a saturated polyester resin, a polyolefin and an acrylatemethacrylate resin. Japanese Kokai Patent Publication No. 62-295951 proposes a polycarbonate resin composition comprising a polycarbonate resin, an aromatic polyester resin and an acrylate-butadiene graft copolymer. Furthermore, Japanese Kokai Patent Publication No. 63-83158 describes a resin composition comprising an aromatic polycarbonate, a thermoplastic polyester, a thermoplastic graft copolymer and a polyolefin.

However, none of these resin compositions are capable of providing all the characteristics required of automotive and other parts, namely sufficient impact resistance, heat resistance, chemical resistance, weather resistance and rigidity and, therefore, further improvements have been much awaited.

Furthermore, in some applications such as exterior parts of motor vehicles, where the clearance between individual parts must be minimal, a low linear coefficient of expansion is another essential requisite.

For insuring a low linear coefficient of expansion, attempts have been made to incorporate glass fiber or the like but such approaches tend to detract from impact resistance and moldability and cause a poor surface appearance of moldings, thus failing to provide fully satisfactory products.

SUMMARY OF THE INVENTION

The present invention is designed to insure the aforesaid multiple performance characteristics which, as a whole, have never been satisfied by conventional resin compositions. Thus, the object of the present invention is to provide a reinforced resin composition capable of providing moldings more satisfactory than ever before in heat resistance, impact resistance, rigidity, dimensional stability, chemical resistance, moldability, weather resistance and thermal stability, with a low linear coefficient of expansion and improved surface gloss and appearance.

After intensive research done to overcome the aforesaid drawbacks of the prior art resin compositions and thereby provide an improved resin composition, the inventors of the present invention discovered that the above-mentioned objects can be neatly accomplished by blending a polycarbonate resin, a thermoplastic polyester and kaolin, with or without addition of an impact modifier, in predetermined proportions. The present invention is predicated on the above finding.

The present invention is, therefore, directed to a reinforced resin composition comprising 100 parts (by weight; the same applies hereinafter) of a resin component comprising a polycarbonate resin, a thermoplastic polyester resin and an impact modifier in a ratio, by weight, of 90–10:10–90:0–40 and 0.5 to 100 parts of a kaolin with a mean particle diameter of 0.1 to 4.0 $\mu$m.

The polycarbonate resin to be used in the present invention is a polycarbonate resin described from a compound containing two phenolic hydroxyl groups (hereafter referred to as a dihydric phenol), which is generally obtainable by reacting a dihydric phenol with phosgene or a carbonic acid diester. The type of dihydric phenol is not limited in kind but bisphenol A is particularly suitable.

The molecular weight (viscosity average molecular weight) of said polycarbonate resin is preferably in the range of 10,000 to 60,000. If the molecular weight of the polycarbonate used is less than 10,000, there may not be sufficient impact resistance and chemical resistance, while the use of a polycarbonate with a molecular weight exceeding 60,000 tends to detract from the moldability of the composition.

The thermoplastic polyester resin to be used in the present invention is a homopolymer or copolymer obtainable by reacting an aromatic dicarboxylic acid or an ester-forming derivative thereof with a diol or an ester-forming derivative thereof and is usually an alternate polycondensation product.

The solution viscosity of this thermoplastic polyester resin, as determined as a logarithmic viscosity number (IV) at a concentration of 0.5 g/dl in phenol-tetrachloroethane (1:1, w/w) at 23° C., is preferably in the range of 0.3 to 2.0 and more preferably 0.5 to 1.5. If the logarithmic viscosity number is less than 0.3, the impact resistance and chemical resistance of moldings tend to be sacrificed, while an IV in excess of 2.0 tends to detract from moldability.

As preferred examples of said thermoplastic polyester resin, there may be mentioned polyethylene terephthalate and polytetramethylene terephthalate but these are not exclusive choices.

As examples of said impact modifier which is optionally employed in the practice of the invention, there may be mentioned core/shell graft polymers, olefinic polymers, thermoplastic polyester elastomers and so on. These modifiers can be used singly or in combination.

The core/shell graft polymers mentioned above can be obtained by graft-polymerizing a vinyl compound with a rubber-like elastomer.

The rubber-like elastomer mentioned above is preferably an elastomer having a glass transition temperature of not higher than 0° C. and preferably not higher than −40° C. As specific examples of such rubber-like elastomer, there may be mentioned diene rubbers such as polybutadiene, butadiene-styrene copolymer, butadiene-butyl acrylate copolymer, etc., polyacrylate rubbers such as polybutyl acrylate, poly(2-ethylhexyl acrylate), etc., olefin rubbers such as ethylene-propylene copolymer, ethylene-propylene-diene copolymer and so on. From the point of view of weather resistance and impact resistance, the use of a butadiene-acrylate copolymer such as butadiene-butyl acrylate copolymer is advantageous. Among species of said butadiene-acrylate copolymer, those copolymers each comprising 50 to 70% (by weight; the same applies hereinafter) of an acrylic ester and 30 to 50% of butadiene are particularly advantageous. If the acrylic ester content of the copolymer is less than 50%, sufficient weather resistance is not obtained, while an acrylate content over 70% tends to detract from impact resistance, particularly low-temperature impact resistance. The average particle size of the rubber-like elastomer is not particularly limited but the range of 0.05 to 2.0 μm is preferred. The gel content is not critical, either. Thus, the range of 10 to 90% is suitable and the range of 40 to 90% is more recommendable.

The vinyl compound which can be used in the production of said core/shell graft polymer includes aromatic vinyl compounds, vinyl cyanides, acrylic esters, methacrylic esters and so on. These compounds can be used singly or in combination. As preferred examples, styrene may be mentioned among said aromatic vinyl compounds, acrylonitrile among said vinyl cyanides, butyl acrylate among said acrylic esters, and methyl methacrylate among said methacrylic esters.

The proportion of said rubber-like elastomer for the production of said core/shell polymer may range from 10 to 90% and is preferably in the range of 15 to 70%. If the proportion of said rubber-like elastomer is less than 10%, the impact resistance of moldings tends to be insufficient, while proportions in excess of 90% tend to reduce the heat resistance of moldings.

The olefinic polymer mentioned above may be any of high-density polyethylene, low-density polyethylene, linear low-density polyethylene, polypropylene, ethylene-propylene copolymer, etc., although these are not exclusive choices. These olefinic polymers may be homopolymers or copolymers. The degree of polymerization of such olefinic polymers is not limiting, either, and generally an olefinic polymer with a melt index in the range of 0.05 to 50 g/10 minutes can be employed with success.

The thermoplastic polyester elastomers mentioned above are copolymers each comprising an aromatic dicarboxylic acid or an ester-forming derivative thereof, a diol or an ester-forming derivative thereof and a polyether having a number average molecular weight of 700 to 3,000, with the unit derived from said polyether therein accounting for 5 to 80% and preferably 10 to 70%. If the proportion of the polyether-derived unit is less than 5%, the improving effect on impact resistance tends to be not appreciable, while any proportion over 80% tends to detract from heat resistance.

The solution viscosity, in terms of the logarithmic viscosity number (IV) as determined at a concentration of 0.5 g/dl in phenol-tetrachloroethane (1:1, w/w) at 23° C., of the aforesaid thermoplastic polyester elastomer may range from 0.3 to 2.0 and is preferably 0.4 to 1.5. If the logarithmic viscosity number is less than 0.3, the impact resistance and chemical resistance of moldings tend to be insufficient, while moldability tends to deteriorate when the viscosity number exceeds 2.0.

As specific examples of the aromatic dicarboxylic acid or ester-forming derivative thereof to be employed in the production of the thermoplastic polyester elastomer, there may be mentioned terephthalic acid, isophthalic acid and their ester-forming derivatives, by way of example. These compounds can be used singly or in combination. The diol or ester-forming derivative thereof includes, among others, ethylene glycol, propylene glycol, tetramethylene glycol and their ester-forming derivatives. These compounds can also be employed singly or in combination. As examples of the polyether, there may be mentioned the polyethers disclosed in Japanese Kokai Patent Publication No. 2-92953, namely polyethylene glycol, polypropylene glycol, polytetramethylene glycol, ethylene oxide-propylene oxide copolymer, and bisphenol A-modified polyethylene glycol which is obtainable by reacting ethylene oxide with 2,2-bis(p-hydroxyphenyl)propane (bisphenol A), among others. These polyethers can be used singly or in combination. As mentioned hereinbefore, the number average molecular weight of the polyether is preferably in the range of 700 to 3,000. If the molecular weight is less than 700, heat resistance will be sacrificed and if it exceeds 3,000, thermal stability tends to be adversely affected.

In the resin component of the invention, the ratio, by weight, of said polycarbonate resin, thermoplastic polyester resin and impact modifier is 90–10:10–90:0–40. If the weight ratio of the polycarbonate resin is less than 10, the impact resistance, heat resistance and dimensional stability of moldings will not be sufficient, while chemical resistance and moldability are sacrificed when the weight ratio is more than 90. Regarding the thermoplastic polyester resin, the chemical resistance of moldings as well as moldability will not be fully satisfactory when its weight ratio is less than 10. On the other hand, the use of the thermoplastic polyester resin in a weight ratio of more than 90 will detract from impact resistance and heat resistance. The addition of an impact modifier results in a further improvement in impact resistance (particularly Izod impact strength) but the use of this agent in a weight ratio of more than 40 is not recommendable, for heat resistance, rigidity, moldability and surface hardness will then be sacrificed. The preferred weight ratio of the impact modifier, when it is used, is 0.5 to 40, preferably 1 to 20, and most desirably 1 to 10.

The weight ratio of the polycarbonate resin to the thermoplastic polyester resin is 80–20:20–80 and preferably 80–40:20–60.

In accordance with the present invention, kaolin which is an aluminum silicate mineral is used as a reinforcing filler. The mean particle diameter of kaolin may range from 0.1 to 4.0 μm and is preferably 0.2 to 2.0 μm. Moreover, it is preferable that particles with diameters in the range of 0.05 to 5.0 μm account for not less than 80% of the total amount of kaolin. If the mean particle diameter is less than 0.1 μm, the improving effect on linear coefficient of expansion and rigidity will not be as adequate as desired, while the use of kaolin with a mean particle diameter of more than 4.0 μm tends to result in reduced surface gloss, poor surface appearance and reduced impact resistance.

As the kaolin, one or more members of kaolinite, nacrite, dickite, halloysite and hydrated halloysite can be employed, although a mineral composed predominantly of kaolinite is preferred and a baked (dehydrated) one is particularly preferred.

The kaolin may have been surface-treated with a silane or titanate coupling agent. As examples of the silane coupling agent, there may be mentioned epoxysilane, aminosilane, vinylsilane and so on. The titanate coupling agent may for example be one of monoalkoxy type, chelate type or coordination type. There is no limitation on the method for surface treatment of kaolin with such a coupling agent and any ordinary process can be employed. For example, the coupling agent is added in a proportion of 0.1 to 10% to the kaolin and the mixture is agitated at high speed while heating.

The proportion of kaolin may range from 0.5 to 100 parts to 100 parts of the resin component of the invention, and is preferably 2 to 40 parts, more preferably 2 to 20 parts, and most desirably 3 to 12 parts. If the proportion of kaolin is less than 0.5 part, the improving effect on rigidity and linear coefficient of expansion will not be sufficient, while the addition of kaolin in a proportion of more than 100 parts will adversely affect the surface gloss and appearance of moldings.

The reinforced resin composition of the invention may additionally contain a variety of additives such as phosphite or phenolic stabilizers, light stabilizers, flame retardants, plasticizers, lubricants, parting agents, ultraviolet absorbers, antistatic agents, pigments and dyes. If necessary, reinforcing agents other than kaolin may also be added in a minor proportion.

Production of the reinforced resin composition of the present invention can be carried out by any known technology. For example, the blending method using a blender or supermixer or the blending method using a single-screw or multi-screw extruder may be mentioned. Such blending can be made en bloc, that is to say all of said polycarbonate resin, thermoplastic polyester resin and kaolin as well as the impact modifier, if added, are blended together in one operation, or alternatively in such a manner that some of them are first blended and the remaining ingredient or ingredients are then added and blended.

The reinforced resin composition thus prepared can be molded into automotive parts, electrical or electronic parts and various other products by the known methods such as injection molding, extrusion molding and so on. The resulting products are excellent in heat resistance, impact resistance, rigidity, dimensional stability, chemical resistance, processability, weather resistance and thermal stability, with a low linear coefficient of expansion and excellent surface gloss and appearance.

DETAILED DESCRIPTION OF THE PREFERRED EMBODIMENTS

The following examples are intended to describe the reinforced resin composition of the present invention in further detail.

EXAMPLES 1 THROUGH 7 AND COMPARATIVE EXAMPLES 1 THROUGH 4

The dried polycarbonate resin (A), thermoplastic polyester resin (polyethylene terephthalate resin) (B), impact modifier (C), reinforcing agent (E) and phosphite stabilizer (F), all described below, were preliminarily blended in the proportions indicated in Table 1 to prepare pellets. Using the pellets, testpieces were prepared by injection molding and evaluated for various characteristics. The results are presented in Table 1.

Polycarbonate resin (A)

Panlite L-1225, manufactured by Teijin Kasei Co., Ltd. (viscosity average molecular weight 22,500)

Thermoplastic polyester (B)

EFG-85A, manufactured by Kanebo, LTD. (polyethylene terephthalate resin, logarithmic viscosity number 0.85)

Impact modifier (C)

C-1: WP-547 (polypropylene), manufactured by SumitomoNoblen, Ltd.

C-2: Dowlex 2038 (linear low-density polyethylene), manufactured by Dow Chemical C-3: A core/shell graft polymer prepared by emulsioncopolymerizing 40 parts of a rubber-like elastomer composed of 67% butyl acrylate and 33% butadiene and having a mean particle diameter of 0.15 μm with 60 parts of a mixture of 20% acrylonitrile, 30% methyl methacrylate and 50% styrene.

C-4: A thermoplastic polyester elastomer (IV=0.70) comprising 30% of the unit derived from dimethyl terephthalate and ethylene glycol and 70% of the unit derived from a bisphenol A-modified polyethylene glycol having a number average molecular weight of 1,000 as manufactured by the process (ester interchange in the presence of a catalyst) described in Japanese Kokai Patent Publication No. 2-92953.

Reinforcing agent (E)

E-1: Kaolinite-based baked kaolin with a mean particle diameter of 0.8 μm.

E-2: Kaolin E-1 surface-treated with y-methacryloxypropyltrihydroxysilane

E-3: Kaolinite-based baked kaolin with a mean particle diameter of 20 μm

E-4: Calcium carbonate with a mean particle diameter of 30 μm

Phosphite stabilizer (F)

Adeka Stab PEP-36, manufactured by Asahi Denka Kogyo K.K.

Izod impact test

ASTM D-256, ⅛ inch, notched, 23° C.

Falling ball test

Using plates each measuring 150 mm by 150 mm by 3 mm as testpieces, the test is performed at −30° C. and the height at which ½ of testpieces are destroyed x weight of the ball (kg·m) is calculated.

Flexural modulus

ASTM D-790, 23° C.

Heat resistance

ASTM D-648, load 4.6 kg/cm²

Spiral flow test

Using a 3.5 oz. injection molding machine and a spiral metal mold with a gate dimensioned 3 by 3 mm, a width of 4 mm and a thickness of 3 mm, at a cylinder temperature of 280° C., an injection pressure of 100 kg/cm² (gauge) and a mold temperature of 70° C., the distance of flow of the test material is measured.

Linear coefficient of expansion

ASTM D-696

Surface gloss

JIS K7105, 60° reflectance

Surface appearance

Using a 35-oz injection molding machine, test-pieces are prepared at a cylinder temperature of 280° C. and a mold temperature of 70° C. The surface appearance of box-shaped moldings each weighing about 600 g was visually inspected and evaluated according to the following criteria.

○: Surface gloss irregularity and corrugation are virtually not noticeable

Δ: Surface gloss irregularity and corrugation are noticeable x: Surface gloss irregularity and corrugation are remarkable

TABLE 1

|  | Example |  |  |  |  |  |  | Comparative Example |  |  |  |
|---|---|---|---|---|---|---|---|---|---|---|---|
|  | 1 | 2 | 3 | 4 | 5 | 6 | 7 | 1 | 2 | 3 | 4 |
| Polycarbonate resin (A) (parts) | 68 | 68 | 60 | 70 | 68 | 47 | 68 | 68 | 68 | 68 | 100 |
| Thermoplastic polyester resin (B) (parts) | 27 | 28 | 35 | 30 | 27 | 45 | 30 | 27 | 27 | 27 |  |
| Impact modifier (C-1) (parts) | 3 |  | 2 |  | 3 | 3 |  | 3 | 3 | 3 |  |
| (C-2) (parts) |  | 2 | 1 |  |  |  | 2 |  |  |  |  |
| (C-3) (parts) | 2 | 1 | 1 |  | 2 | 5 |  | 2 | 2 | 2 |  |
| (C-4) (parts) |  |  | 1 | 1 |  |  |  |  |  |  |  |
| Composition (D) (A + B + C) (parts) | 100 | 100 | 100 | 100 | 100 | 100 | 100 | 100 | 100 | 100 | 100 |
| Reinforcing agent (E-1) (parts) | 9 | 9 |  | 9 | 20 | 20 | 10 |  |  |  |  |
| (E-2) (parts) |  |  | 9 |  |  |  |  |  |  |  | 10 |
| (E-3) (parts) |  |  |  |  |  |  |  |  | 9 |  |  |
| (E-4) (parts) |  |  |  |  |  |  |  |  |  | 9 |  |
| Phosphite stabilizer (F) (parts) | 0.5 | 0.5 | 0.5 | 0.5 | 0.5 | 0.5 | 0.5 | 0.5 | 0.5 | 0.5 | 0.5 |
| Izod impact (kgcm/cm) | 20 | 19 | 17 | 14 | 13 | 12 | 16 | 42 | 8 | 9 | 11 |
| Falling ball test (kg.m) | 3.1 | 3.0 | 2.9 | 2.8 | 2.4 | 2.4 | 2.7 | 4.1 | 1.4 | 1.6 | 1.8 |
| Flexural modulus (kg/cm²) | 370 | 371 | 368 | 375 | 415 | 410 | 378 | 220 | 345 | 330 | 370 |
| Heat resistance (°C.) | 143 | 144 | 135 | 145 | 149 | 148 | 145 | 124 | 141 | 135 | 155 |
| Spiral flow test (mm) | 620 | 630 | 660 | 620 | 580 | 610 | 610 | 680 | 580 | 570 | 280 |
| Linear coefficient of expansion ($\times 10^{-5}$/°C.) | 4.3 | 4.3 | 4.5 | 4.2 | 3.9 | 4.1 | 4.2 | 8.5 | 4.3 | 7.1 | 4.1 |
| Surface gloss (%) | 84 | 84 | 83 | 84 | 64 | 69 | 82 | 85 | 30 | 20 | 25 |
| Surface appearance | ○ | ○ | ○ | ○ | Δ | Δ | ○ | ○ | x | x | x |

What is claimed is:

1. A reinforced resin composition comprising 100 parts by weight of a resin component comprising a polycarbonate resin, a thermoplastic polyester resin and an impact modifier in a ratio, by weight, of 90–10:10–90:0–50 and 0.5 to 100 parts by weight of a kaolin with a mean particle diameter of 0.2 to 2.0 μm.

2. A reinforced resin composition as claimed in claim 1 which comprises 100 parts by weight of a resin component comprising a polycarbonate resin, a thermoplastic polyester resin and an impact modifier in a ratio, by weight, of 90–10:10–90:1–20 and 0.5 to 100 parts by weight of a kaolin with a mean particle diameter of 0.2 to 2.0 μm.

3. A reinforced resin composition as claimed in claim 1 wherein said polycarbonate resin has a viscosity average molecular weight of 10,000 to 60,000.

4. A reinforced resin composition as claimed in claim 1 wherein said thermoplastic polyester resin is polyethylene terephthalate.

5. A reinforced resin composition as claimed in claim 1 wherein said impact modifier is at least one member selected from the group consisting of core/shell graft polymer, polyolefin and thermoplastic polyester elastomer.

6. A reinforced resin composition as claimed in claim 5 wherein said core/shell graft polymer is a polymer obtainable by graft-polymerizing 10 to 90 parts by weight of at least one member selected from the group consisting of aromatic vinyl compounds, vinyl cyanide compounds, esters of acrylic acid and esters of methacrylic acid in the presence of 10 to 90 parts by weight of a copolymer comprising 50 to 70% by weight of acrylic ester and 30–50% by weight of butadiene.

7. A reinforced resin composition as claimed in claim 5 wherein said thermoplastic polyester elastomer is a copolymer comprising an aromatic dicarboxylic acid or an ester-forming derivative thereof, a diol or an ester-forming derivative thereof, and a polyether having a number average molecular weight of 700 to 3,000.

8. A reinforced resin composition as claimed in claim 1 wherein said kaolin is a baked kaolin.

9. A reinforced resin composition as claimed in claim 1 wherein said kaolin is a kaolin surface-treated with a silane or titanate coupling agent.

10. A reinforced resin composition as claimed in claim 1 which contains 2 to 40 parts by weight of kaolin.

11. A reinforced resin composition as claimed in claim 1 which contains 2 to 20 parts by weight of kaolin.

12. A reinforced resin composition as claimed in claim 1 which contains 3 to 12 parts by weight of kaolin.

13. A reinforced resin composition as claimed in claim 1, wherein, further, at least 80% of the diameters of the kaolin particles are in a range of 0.05–5.0 μm.

* * * * *